Feb. 19, 1935.   O. HUWYLER   1,991,676
OIL CATARACT CONTROL GEAR
Filed Feb. 17, 1932
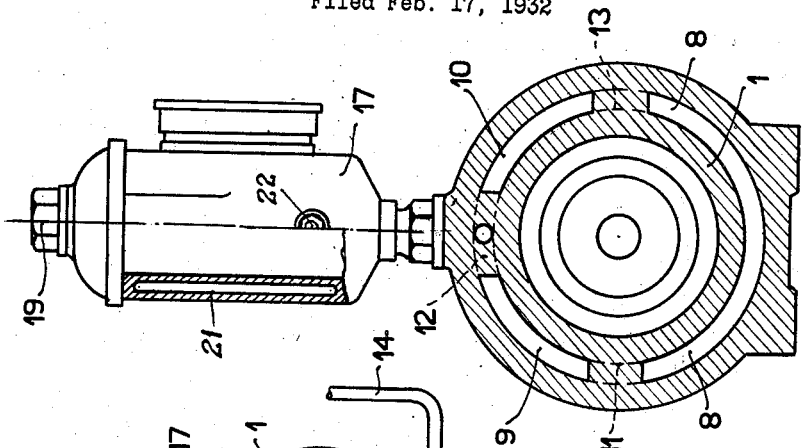
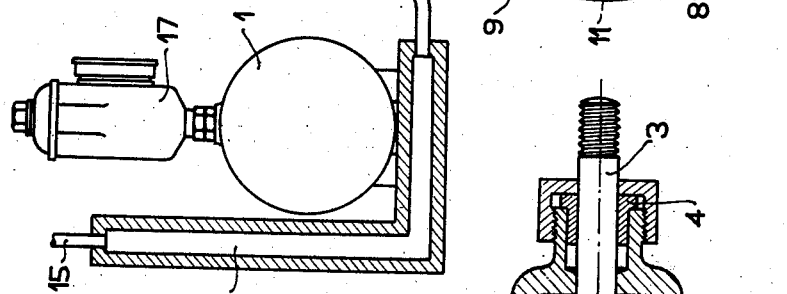
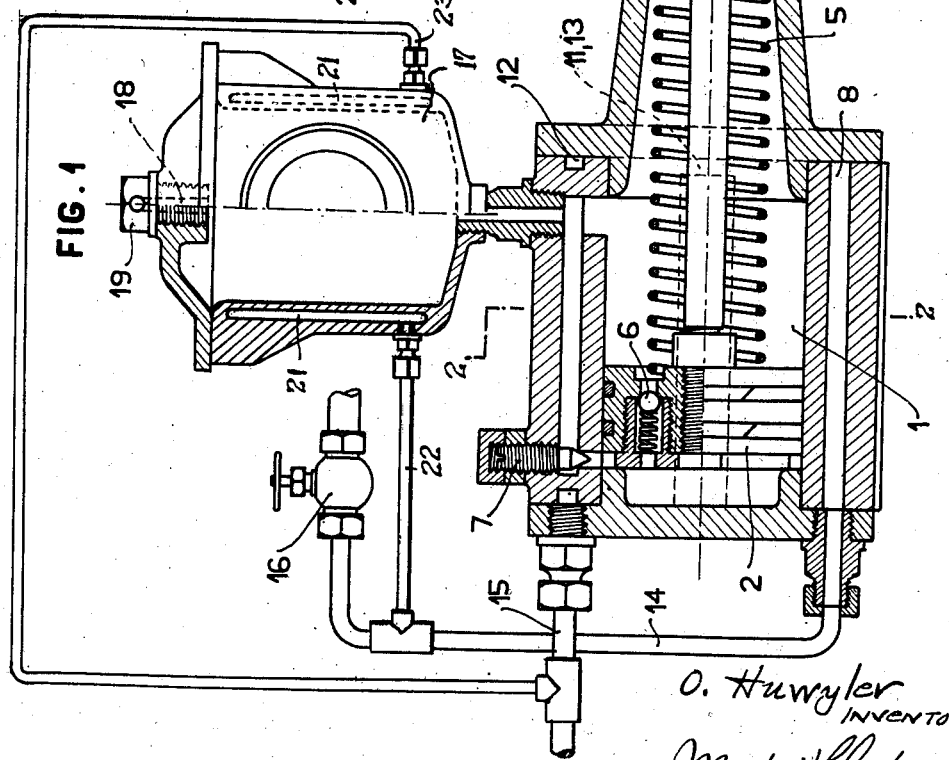
O. Huwyler
INVENTOR
By: Markes+Clark
ATTYS.

Patented Feb. 19, 1935

1,991,676

UNITED STATES PATENT OFFICE 1,991,676

OIL-CATARACT-CONTROL GEAR

Oswald Huwyler, Vienna, Austria

Application February 17, 1932, Serial No. 593,679
In Austria April 10, 1931

2 Claims. (Cl. 188—97)

This invention relates to oil cataract-control gears, of the type comprising a cylinder having a piston therein, said cylinder being filled with oil which, during the travel of the piston in one direction is allowed to flow freely from one side of the piston to the other through comparatively large openings, while during the travel of the piston in the other direction the oil flows back through a restricted opening or openings, whereby the return movement of the piston is retarded. Such control gears are employed in conjunction with parts, such as control valves which are required to move rapidly in one direction and slowly in the other. If such oil cataract gear be employed in conjunction with parts which become heated to a high temperature, and if the oil in the cylinder be subjected to the high temperatures generated by or in these parts there is danger of the oil becoming carbonized, of the stuffing boxes becoming leaky, and of any control springs which may happen to be employed in connection with the piston in the oil cylinder losing their temper. If, in addition, the temperature to which the oil is exposed is variable under working conditions the temperature, and with it the viscosity, of the oil will also vary proportionately. The resistance which the oil offers to the displacement of the piston in the cylinder is, however, dependent on the viscosity of the oil, and therefore, if the viscosity of the oil varies the speed at which the piston moves in the cylinder will vary also, and with it the time of travel of the member, the movement of which is required to be controlled. And since control gear of the type in question is usually designed for the express purpose of carrying out a control movement or action in a precisely given length of time, the variation of the viscosity of the oil under working conditions effectually prevents the purpose of such control gear from being fulfilled.

The described drawbacks of the hitherto known oil cataract-control gears when employed in association with highly heated parts are obviated, in accordance with the present invention, by the provision of a water-traversed chamber between the highly heated parts and the oil cylinder. This water-traversed chamber prevents the oil from becoming heated to an inadmissibly high temperature at which it could carbonize. Further, in accordance with the invention, the said water-traversed chamber is provided with an adjustable inlet or outlet for the water, so that by regulation of the volume of water flowing through the chamber the temperature of the oil contained in the cylinder, and therefore also the viscosity of the same, can be regulated to suit the requirements of working, or can be kept constant.

Two forms of construction embodying the invention are illustrated, by way of example, in the accompanying drawing, in which:—

Fig. 1 is a longitudinal section of an oil cataract device constructed in accordance with the invention.

Fig. 2 is a transverse section on the line 2—2 of Fig. 1.

Fig. 3 illustrates a modified construction and arrangement of the water-traversed chamber.

In the form of construction shown in Figs. 1 and 2 a piston 2 is fitted in the oil-filled cylinder 1 and is provided with a simple piston-rod 3 which is guided in a stuffing box 4 and is connected to the member to be controlled, for example a valve. The piston 2 is provided with a plurality of non-return valves 6 which permit the transference of the oil from one side of the piston to the other during travel of the piston from left to right but obstruct the passage of the oil during the return movement of the piston in the opposite direction, which is effected by means of a spring 5 which bears against the right hand side of the piston (Fig. 1). The movement of the piston from left to right is produced by the member the action of which is to be controlled or by means of actuating means connected to the said member, which movement will take place comparatively rapidly, while the return movement takes place slowly under the action of the spring 5, the oil being only able to flow from the left hand side of the piston to the right hand side through the regulating valve 7 which only permits a slow transfer of the oil to take place. The valve 7 thus determines the time taken for the piston and the member controlled by it to return to its initial position as shown in Fig. 1.

The oil cylinder 1 is surrounded by three water chambers 8, 9, and 10 which are interconnected by channels 11, 12, and 13. To the chamber 8 there is connected a pipe 14 communicating with a water supply line, while to the chamber 10 there is connected an outflow pipe 15. In the inlet pipe 14 there is interposed a valve 16 which serves for the regulation of the volume of water transmitted through the jacket chambers. The water jacket 8, 9, 10 surrounding the oil cylinder effectively protects the oil from the heat radiated or transmitted from hot parts in the vicinity, and prevents the temperature of the oil from varying within considerable limits. The provision of the valve 16 in the flow pipe 14 enables the volume of water flowing through the jacket 8, 9, 10, and a jacket 21 of a small oil container 17 hereinafter described to be increased or reduced at will, and the temperature of the oil to be thereby regulated precisely as desired.

The valve 16 could equally well be provided in the outflow pipe 15 instead of in the flow pipe 14.

In the form of construction shown in Fig. 1 the oil piston 2 is provided only on one side with a piston-rod 3. For the compensation of the variations in the volume of the oil in the cylinder which result from the displacement of the piston having a simple piston-rod on one side thereof the small oil container 17 is connected to the oil cylinder in a known manner. The interior of this container 17 communicates with the outside atmosphere by means of a channel 18 drilled in the screw plug 19.

The water jacket 21 with which this oil container 17 is provided, in accordance with the invention is connected to the flow system through the chambers 8, 9 and 10, in the example shown, by means of two pipes 22 and 23 which branch off from the pipes 14 and 15.

In the form of construction shown in Fig. 3 the water-traversed chamber does not take the form, as in the above-described constructional example, of a jacket surrounding the oil cylinder, but of a hollow bracket 20.

The interior of the hollow bracket 20 is connected up to a flow pipe 14 and an outflow pipe 15, the former being connected up to a supply line, elevated reservoir or the like (not shown). In this case the hollow bracket screens the oil in the cylinder 1 from heat radiated from heated machine parts in proximity to the cylinder. The water circulation through the screening member 20 can be regulated in accordance with the temperature of the heated parts from which the cylinder 1 is to be screened. It is of no importance that the cylinder 1 is not directly cooled since the heat generated in the interior of the cylinder is in itself negligible and, moreover, the quantity of heat produced during each controlling operation is the same, so that the controlling operation is not detrimentally influenced by the heat generated in the cylinder. On the other hand the radiation of heat from other machine parts situated in the vicinity and the temperature of which may fluctuate irregularly may cause the temperature of the oil in the cylinder to vary irregularly also with detrimental effects on the action of the control gear. By interposing the water-cooled bracket 20 between the cylinder 1 and the hot machine part or parts so as to screen the cylinder from the heat radiated by the said machine parts, any detrimental effects which might be produced by the radiated heat are avoided.

What I claim is:

1. Oil cataract control gear of the kind described, comprising in combination a cylinder containing oil, a piston movable in said cylinder, a piston rod connected to said piston and passed through the cylinder for operatively connecting the piston to a movable member for controlling the movement of said member, an auxiliary oil container in open communication with the cylinder, cooling means for said cylinder comprising a chamber adapted to be traversed by cooling water and arranged to abstract heat transmitted from hot parts situated outside and in proximity to the cylinder to the contents of the cylinder, conduits for supplying cooling water to and abstracting water from said chamber and a cooling jacket for the auxiliary oil container connected to said conduits so as to receive cooling water therefrom.

2. Oil cataract control gear of the kind described, comprising in combination a cylinder, a piston movable in said cylinder and having means connected thereto for operatively connecting it to a movable member for controlling the movement of said member and cooling means for preventing overheating of the contents of the cylinder, comprising a plurality of cooling chambers surrounding the cylinder and conduits connected thereto for the supply to and withdrawal of cooling water from said cooling chambers.

OSWALD HUWYLER.